UNITED STATES PATENT OFFICE.

FRIEDRICH LUDWIG BARTELT, OF CORSTON LODGE, NEAR BRISTOL, ENGLAND.

CLEANSING OF LINEN, WOOLEN, COTTON, AND OTHER GOODS.

1,267,737.　　　　　　　　Specification of Letters Patent.　　Patented May 28, 1918.

No Drawing.　　　Application filed December 10, 1914.　Serial No. 876,592.

*To all whom it may concern:*

Be it known that I, FRIEDRICH LUDWIG BARTELT, a subject of the King of Great Britain, and resident of Corston Lodge, near Bristol, England, gentleman, have invented new and useful Improvements Relating to the Cleansing of Linen, Woolen, Cotton, and other Goods, of which the following is a specification.

The prevailing practice in the treatment of cotton, linen, and other fabrics during the process of washing and bleaching is in the ordinary way to apply oxidizing materials, fatty acids (soaps) and alkaline products which are calculated to remove from the fiber all gum, wax, oil and other fatty matter, also all adhesive foreign substances not appertaining to the fiber. Consequently all natural lubrication is withdrawn from the fiber by these means, and the pliability, firmness, and durability of the same are very considerably impaired. Repeated washing and drying under such conditions would make the fiber brittle and tender and shorten the life considerably.

According to my invention I employ a method of nourishing the fiber by means of lubricating agents which will maintain the fiber pliable, firm, and durable however often it may be washed.

For this purpose I employ in washing and cleansing the fabrics and removing starch and other adhesive matters therefrom, carbonate of soda as base mixed with glycerin, which carbonate of soda is suitable for washing and cleansing and which will partially dissolve in contact with glycerin. I take carbonate of soda (58% alkali) finely ground and I thoroughly mix with it an aqueous solution of glycerin. As I require only a small percentage of glycerin I employ an aqueous solution in order to permeate the whole mass of carbonate of soda uniformly and throughout with glycerin. This mixture should be allowed to stand until the glycerin has had time to act upon the carbonate of soda, to dissolve it to such a degree that the whole mass becomes very smooth and to touch butter-like. The compound in this condition is hygroscopic when exposed to air.

I have found that a mixture with 5% of glycerin and a sufficiency of water gives very satisfactory results.

I do not confine myself to the use of the mentioned quantities only; I may vary the same in accordance with my requirements.

I may if required add to this compound any suitable disinfecting, lathering, or bleaching agents or products without interfering with the cardinal conditions of the base of glycerin and carbonate of soda compound as a washing, cleansing, and nourishing agent.

For instance I may add zinc in soluble form. In preparing the compound with zinc I add to an aqueous solution of hydroxid of potash or hydroxid of soda, about 5% zinc, or a zinc salt, preferably metallic zinc until the same is entirely dissolved and the solution forms a water clear liquor. To this solution I add about 5% glycerin under agitation to form a homogeneous mass. To this liquor I add between 50% and 60% of carbonate of soda, preferably 58% alkali in powdered form and mix the whole thoroughly until it becomes one even mass. During this process a great deal of heat is generated. I allow the whole to stand until the action of the glycerin upon the carbonate of soda is complete and the whole product cooled down and formed into a firm mass.

When this is accomplished I pass the whole through rollers or a mill, reducing it into a more or less powdery form, which when pressed between the fingers will have a soft soapy feel. If the product is required to show a lather or foam during the process of cleansing, I may advantageously add during the manufacturing process, 5% of suitable proteids or fatty acids, preferably in solution so as to combine readily, evenly and homogeneously with the whole. I do not bind myself to the quantities mentioned as they may be varied in accordance with requirements.

Such a cleansing compound gives a greater firmness to the fiber and reduces fluffing of fabric or fiber during the process of cleansing or washing, very considerably.

It will be understood that this is not a saponified mixture or soap.

What I claim and desire to secure by Letters Patent of the United States is:—

A cleansing compound for fabric or fibers from which fabrics are made, consisting essentially of carbonate of soda and glycerin and having incorporated therewith a soluble zinc salt, in substantially the proportions specified.

In testimony whereof I have signed my name to this specification in the presence of two subscribing witnesses.

FRIEDRICH LUDWIG BARTELT.

Witnesses:
ALFRED S. BISHOP,
A. D. DINSDALE.